(12) United States Patent
Lervik et al.

(10) Patent No.: US 9,429,263 B2
(45) Date of Patent: Aug. 30, 2016

(54) SYSTEM AND SYSTEM ELEMENTS FOR DIRECT ELECTRICAL HEATING OF SUBSEA PIPELINES

(71) Applicant: Sinvent AS, Trondheim (NO)

(72) Inventors: Jens Kristian Lervik, Kval (NO); Harald Kulbotten, Ler (NO)

(73) Assignee: SINVENT AS, Trondheim (NO)

( * ) Notice: Subject to any disclaimer, the term of this patent is extended or adjusted under 35 U.S.C. 154(b) by 425 days.

(21) Appl. No.: 13/944,633

(22) Filed: Jul. 17, 2013

(65) Prior Publication Data

US 2014/0016918 A1 Jan. 16, 2014

Related U.S. Application Data (63) Continuation of application No. PCT/NO2012/050010, filed on Jan. 30, 2012.

(30) Foreign Application Priority Data

Jan. 28, 2011 (NO) .................................. 20110153

(51) Int. Cl.
| | | |
|---|---|---|
| *E03B 7/10* | (2006.01) | |
| *H05B 3/60* | (2006.01) | |
| *F16L 53/00* | (2006.01) | |

(Continued)

(52) U.S. Cl.
CPC ............ *F16L 53/004* (2013.01); *F16L 53/007* (2013.01); *F17D 1/18* (2013.01); *H05B 3/0004* (2013.01); *H05B 3/0023* (2013.01); *H05B 6/108* (2013.01); *H05B 2214/03* (2013.01)

(58) Field of Classification Search
None
See application file for complete search history.

(56) References Cited

U.S. PATENT DOCUMENTS

| | | | | |
|---|---|---|---|---|
| 3,515,837 A | * | 6/1970 | Ando .................... | H05B 6/105 219/618 |
| 3,665,154 A | * | 5/1972 | Ando .................... | H05B 6/108 392/469 |

(Continued)

FOREIGN PATENT DOCUMENTS

| | | |
|---|---|---|
| EP | 1 524 883 A1 | 4/2005 |
| EP | 2 166 637 A1 | 3/2010 |

(Continued)

OTHER PUBLICATIONS

Jens Kristian Lervik et al. "Direct Electrical Heating of Subsea Pipelines," Proceedings of the Third 1993 International Offshore and Polar Engineering Conference, ISOPE 1993, International Soceity of Offshore & Polar Engineers (s. 176-484, 9 pages).

(Continued)

*Primary Examiner* — Thor Campbell
(74) *Attorney, Agent, or Firm* — Robert P. Michal, Esq.; Carter, DeLuca, Farrell & Schmidt, LLP (57) ABSTRACT

A device for high efficiency induction heating or direct electrical heating, DEH, of a number, M, $M \in [1, N)$ of a group of parallel subsea pipelines N, where $N \in [2, \infty)$, and where a number of conductor cables, W, supplies electrical power from at least one top side power supply to M of the parallel subsea pipelines N, wherein the number of electric conductors, W, from the at least one top side power supply connected to the M pipelines is defined to be in the group $W \in [N, N+1]$, where N, W and M are natural numbers.

19 Claims, 8 Drawing Sheets

(51) Int. Cl.
  *F17D 1/18* (2006.01)
  *H05B 3/00* (2006.01)
  *H05B 6/10* (2006.01)

(56) References Cited

U.S. PATENT DOCUMENTS

| | | | | |
|---|---|---|---|---|
| 3,974,398 A * | 8/1976 | Othmer | ............... | H01B 7/16 307/147 |
| 3,975,617 A * | 8/1976 | Othmer | ............... | H05B 6/108 137/341 |
| 3,983,360 A * | 9/1976 | Offermann | ............... | F16L 53/004 137/341 |
| 4,303,826 A * | 12/1981 | Ando | ............... | F16L 53/004 137/341 |
| 5,256,844 A * | 10/1993 | Grosvik | ............... | F16L 53/004 138/103 |
| 6,049,657 A * | 4/2000 | Sumner | ............... | E21B 17/01 324/425 |
| 6,509,557 B1 * | 1/2003 | Bass | ............... | F16L 53/007 166/248 |
| 6,617,556 B1 | 9/2003 | Wedel | | |
| 2003/0016028 A1 | 1/2003 | Bass | | |
| 2007/0246348 A1 * | 10/2007 | Britton | ............... | C23F 13/10 204/196.18 |
| 2010/0101663 A1 | 4/2010 | Granborg | | |
| 2012/0217000 A1 * | 8/2012 | Bremnes | ............... | F16L 53/007 166/57 |
| 2014/0376900 A1 * | 12/2014 | Bjerknes | ............... | F16L 53/008 392/480 |

FOREIGN PATENT DOCUMENTS

| | | |
|---|---|---|
| NO | 304533 B1 | 2/1997 |
| WO | WO 2007/011230 A1 | 1/2007 |
| WO | WO 2009/027305 A2 | 3/2009 |

OTHER PUBLICATIONS

Kulbotten, Harald, et al. "Direct Electrical Heating of Pipelines—A Method for Preventing Hydrates and Wax in Subsea Transport Pipelines," SINTEF Energy Research, NordIS 2005. (5 pages).

Norwegian Search Report from Norwegian IPO dated Aug. 23, 2011 which was issued in a related NO Application No. NO20110153 (2 pages).

PCT International Search Report mailed May 11, 2012 issued in a related PCT application No. PCT/NO2012/050010 (2 pages).

\* cited by examiner

SYSTEM AND SYSTEM ELEMENTS FOR DIRECT ELECTRICAL HEATING OF SUBSEA PIPELINES

CROSS REFERENCE TO RELATED APPLICATIONS

This is a Continuation of PCT International Application PCT/NO2012/050010 filed Jan. 30, 2012, which in turn claims benefit under 35 U.S.C. §119(a) and 37 CFR §1.55 to Norwegian Application No. NO 20110153 filed Jan. 28, 2011, the entire disclosure of each of which is incorporated herein by reference.

TECHNICAL FIELD

The present invention relates to means and a system for direct electrical heating of subsea pipelines, in more particular it relates to means for high efficiency induction heating or direct electrical heating, DEH, of a number, M, $M \in [1, N)$ of a group of parallel subsea pipelines N, where $N \in [2, \infty)$, and where a number of conductor cables, W, supplies electrical power from at least one top side power supply to M of the parallel subsea pipelines N. According to the invention the disclosed system more particularly relates to a system for direct electrical heating of subsea pipelines, DEH, or induction heating of at least a first of at least two parallel subsea pipelines comprising conductor cables in which at least one supplies electric power from a top side to the at least first of at least two parallel subsea pipelines.

BACKGROUND ART

For unprocessed well stream in ordinary subsea pipelines, the temperature of oil, gas and produced water will drop rapidly due to cooling from the surrounding seawater. The low temperature results in undesired fluid properties. At high pressures hydrates start to precipitate already at temperatures in the range of 20-25° C. Large amounts of hydrate, which is similar to ice crystals, can precipitate on the pipe wall and cause blocking of well stream transport. For some fields wax formation in the flowing crude may also cause operational problems due to increased pressure loss in the pipeline. The viscosity of waxy oil can be of such magnitude, that full "shut in wellhead pressure" will not be sufficient for getting the cold fluid on stream again after long shut downs. The use of chemicals to remove hydrates will in practice mean to use methanol or glycol. The disadvantage with use of chemicals is that large amounts are often needed and implies a risk to the environment if leakage should occur.

A way to remove hydrates is to supply heat to the pipe content. Direct Electrical Heating (DEH) has been developed and qualified for heating of pipelines and is installed on several subsea pipelines in the North Sea. Electrical heating of pipelines implies reduced investments of depressurizing systems and recovery plants for chemical residual products. Especially for deep-water fields electrical heating of pipelines is attractive for achieving reliable operation of transport pipelines. The method, which has used a single phase 50/60 Hz powered system, is presented in [1, 2].

Both single and multiple pipelines are installed according to the principle described in [1, 2]. For dual pipelines the supply cables, dynamic riser and static feeder, are now designed with four conductors. Due to the high currents required for feeding the DEH system, large conductor cross sections are needed to avoid over-heating of these cables.

The DEH system is fed from an AC power supply by special supply cables (riser cables, static single core feeding cables etc) to the pipeline connection point at the near end and to the piggyback cable, which is routed along the pipeline to the pipe connection at the far end. At both connection ends the pipeline is supplied with anodes. These anodes provide grounding of the pipeline and transfer some of the current to seawater. In order to keep the transfer current density both for the anodes and for pipe steel through possible cracks in the pipe thermal coating, a sufficient number of anodes distributed over approximately 50 m length (current transfer zone, CTZ) are required. The return current flows partly through seawater and partly through the pipeline, which is intended to be heated. The circuits are not closed loop circuits, due among others to safety reasons as the anodes and pipelines are not electrically isolated from the surrounding seawater. In addition to the anodes at each end, the pipeline may be supplied with distributed anodes in order to limit the pipe voltage, which occur if the magnetic and/or electrical properties of the pipe steel (in the individual pipe joints) varies along the pipeline.

In addition to the problem related to high cross sections of the riser cables, the prior art methods of DEH includes problems with AC corrosion of anodes. It is also problems related to safety distances to steel structures in particular close to CTZ (Current Transfer Zones) of traditional DEH systems for subsea pipelines.

It is known from US2010101663 (A1) a fluid flow within a transportation pipeline that is heated with low voltage, high current electrical energy induced into a conductive closed loop structure by one or more transformers. The closed loop structure is preferably a fluid transportation pipeline constructed of electrically conductive sections of pipeline. The amount of current induced is sufficient in relation to the inherent resistivity of the conductive sections to cause the generation of heat within the pipeline sections. By conductive and convective heat transfer, the heat induced into the pipeline structure is transferred to a fluid flow within the pipeline. The current is preferably an alternating current of frequency which causes a majority of the current to travel at or near the outer surfaces of the pipeline sections which increases the effective resistivity of the sections and heat generation therein.

WO2007011230 (A1) discloses a power system that provides electrical power to an electric load circuit comprising a three-phase electrical power generation and power transmission system 1 being coupled to an electric load 4,2,21. The three-phase generation and transmission system is connected to said subsea located electric load 4,2,21 via a three-phase to two-phase transformer 2, said electric load being connected to the secondary side of said three-phase to two-phase transformer 2 so as to form a balanced electric load on the three-phase electrical power generation and power transmission system 1. The power system may further be connected to an end load 30 for providing power to components or equipment connected to or powered by the end load 30.

EP2166637 (A1) discloses a power supply arrangement for supplying electrical power to a pipeline. The power supply arrangement is a direct electrical heating system for a pipeline system that comprises three phase transformer (2), a symmetrisation unit (14) and a compensation unit (22).

Other examples of systems and methods for heating pipelines can be found in US 2003/0016028 A1, U.S. Pat. No. 6,509,557 B1 and NO 304533 B1.

The present invention discloses new configurations of the electrical circuits applicable for both single and multiple pipelines, which implies that the number of single core supply cables and the conductor cross section can be reduced. The power losses in the cables are significantly reduced, which solve a problem with overheating. This makes improvement especially for the supply cables, multi core riser cable, routed from topside to the connection of the DEH cables subsea. The new method implies that both number of single core cables and cable conductor cross section can be reduced and hence reduces investment cost considerably.

Furthermore it is an object according to the present invention to overcome or reduce problems related to AC corrosion and exposure of magnetic field and stray current in neighbouring structures as indicated above.

DISCLOSURE OF INVENTION

The objectives according to the present invention are met by means for high efficiency induction heating or direct heating, DEH, of a number of parallel subsea pipelines.

In particular it is disclosed means for high efficiency induction heating or direct electrical heating, DEH, of a number, M, M∈[1, N] of a group of parallel subsea pipelines N, where N∈[2, ∞), and where a number of conductor cables, W, supplies electrical power from at least one top side power supply to M of the parallel subsea pipelines N. Where the numbers of electric conductors, W, from the at least one top side power supply connected to the M pipelines is defined to be in the group W∈[N, N+1], where N, W and M are natural numbers. The invention is further specified in that electric AC current with different phase angle in each of the W electric conductors is supplied to the M pipeline(s).

According to one embodiment of the invention the at least first of two pipelines are supplied with electric power at a far end CTZ of the at least two pipelines.

According to another embodiment of the invention it is disclosed that the electric power at the far end of two pipelines, the first and a second pipeline, is fed by one power cable which runs in parallel to the two pipelines and which is connected to the first pipeline at the far end CTZ, current is transferred through the first pipeline to the near end CTZ, at the near end CTZ the first pipeline is electrically connected to the second pipeline, current is transferred through the second pipeline to the far end CTZ, whereas return current is returned to a riser by one power cable connected to the second pipeline at the far end CTZ.

According to yet an embodiment of the invention it is disclosed that a short circuit connection (k) is connected between the connections at the far end/near end CTZ of the two pipelines.

According to yet an embodiment of the invention it is disclosed that the electric power at the far end of the at least two pipelines, the first and second pipeline, is fed by one power cable, which runs in parallel to the two pipelines, and which is connected to the first pipeline at the far end CTZ, current is transferred through the first pipeline to the near end CTZ, at the near end CTZ the first pipeline is electrically connected to the second pipeline and to a centre return conductor, current is transferred through the second pipeline to the far end CTZ, whereas return current from the second pipeline is returned to a riser by one power cable connected to the second pipeline at the far end CTZ.

According to yet an embodiment of the invention it is disclosed that the phase difference between current's phase angles supplied from top side is $2\pi/M$, where M is the number of pipelines to be heated.

According to yet an embodiment of the invention it is disclosed that the at least one power supply is a power source of 50-200 Hz.

According to yet an embodiment of the invention it is disclosed that intermediate anodes is connected to the M pipelines between the near end and far end CTZ.

In accordance with one aspect of the invention the means for high efficiency induction heating or direct electrical heating indicated above is further specified in that least portions of the at least one of the pipelines to be heated are treated by surface treatments methods so as to provide an optimum pipe impedance. Where the surface treatment method may include grit blasting. It is further disclosed that rating of DEH of the at least portions of the pipelines to be heated is provided by means of finite element simulations in which an equivalent electrical circuit of the at least portions of the pipelines to be heated, and power supply conductors, are provided as input to the finite element simulations. According to one aspect of the invention the input parameters to the finite elements method at least comprises:

$\mu r$, the relative permeability which is a function of current and distance between a pipeline to be heated and a power supply cable which runs in parallel to the pipeline or portion of pipeline;

Cp1, which is a function of the pipe current and distance between the power supply cable and the pipe;

Zc1, which is the impedance of the power supply cable which runs in parallel to the pipeline or portion of pipeline;

Zp1, which is the impedance of the pipeline or portion of pipeline excluding Cp1, and Zs, which is the impedance of the seawater surrounding said pipeline or portion of pipeline.

According to yet an embodiment of the invention it is disclosed that a second power supply G2 is provided to supply current in a reduction transfer current cable routed in parallel to the heated pipeline(s) M at a distance, d, the current through the reduction transfer current cable is adjusted to equal the absolute value of a steady state current in seawater, thereby reducing current transfer through CTZ. According to one aspect it is further assumed that the phase angle for the reduction current will have approximately 180° displacement referred to the total transfer current.

The objects according to the present invention are also met by a system for DEH or induction heating of at least a first of at least two parallel subsea pipelines.

In particular the system for DEH or induction heating of at least a first of at least two parallel subsea pipelines comprising power cables in which at least one supplies electric power from a top side to the at least first of at least two parallel subsea pipelines, where the system further comprises, at least one power supply at the top side;

at least one riser cable including at least two power cables; and at least two connections from the at least two power cables from the at least one riser, one connection to a return power cable at the near end CTZ, where the return cable runs in parallel with a second pipeline and is connected to the second pipeline at the far end CTZ and one connection to a power supply cable at the near end CTZ which runs in parallel with the first pipeline and which is connected to the far end CTZ of the first pipeline.

In accordance with one aspect of the invention the system for DEH or induction heating is specified in that at least one capacitor bank is provided between the power supply cables.

In another aspect of the system for DEH or induction heating it is disclosed that a second power supply G2 is provided to supply current in a reduction transfer current cable routed in parallel to the heated pipeline(s) M at a distance, d, the current through the reduction transfer current cable is adjusted to equal the absolute value of a steady state current in seawater, thereby reducing current transfer through CTZ.

These and further advantages of the present invention will be apparent from the appended independent claims.

Particularly advantageous embodiments will be apparent from the dependent claims.

BRIEF DESCRIPTION OF DRAWINGS

The present invention will now be described with reference to the accompanying drawings in which.

MODE(S) FOR CARRYING OUT THE INVENTION

The present invention will now be described with support and reference to the accompanying drawings. The drawings are not to scale and they are intended to facilitate the understandings of the principles disclosed herein.

The invention includes a complete system for DEH or induction heating of one or more pipelines inclusive the cable system from topside through, risers, feeding power. According to the invention it is also disclosed configurations of elements being part of a complete system for DEH or induction heating. Configurations related to anodes for connection to DEH pipelines are also included.

Figure 10:
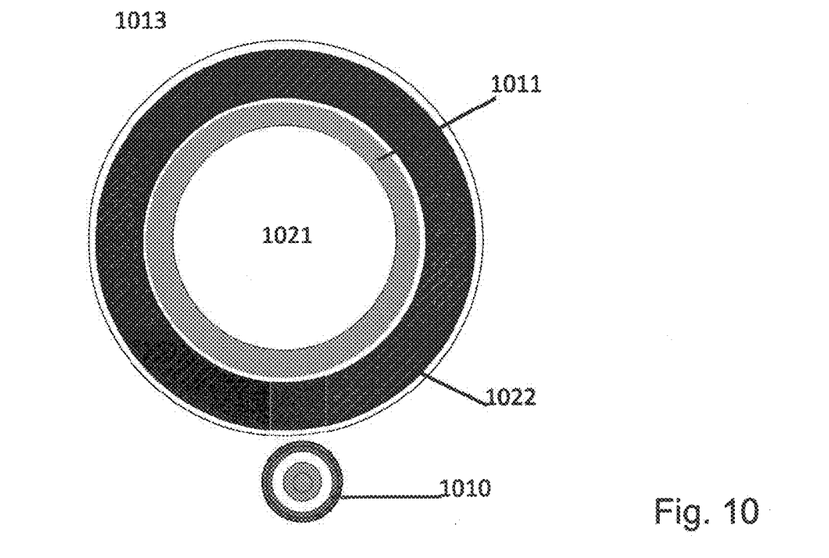
FIG. 10 shows an example of a DEH configuration where the DEH cable can be piggybacked or located close to the pipeline, the cable can also be supported by a mechanical protection system.

It shall be noted that power supply cables to the DEH pipelines normally are piggybacked, however, wherever the wording piggyback is used it shall be understood that the wording may include one or more parallel supply cables which are not piggybacked to the DEH pipeline (FIG. 10). Also, the wording power cable(s), feeding cable(s), and/or conductors in the meaning of conductors which supplies current/power are used interchangeably throughout the description The present DEH system is qualified for 50/60 Hz, but in principle higher frequencies can be used. The most interesting frequency range is primarily up to 200 Hz. Power cables are in use for other purposes at these frequencies (power cables to pumps by VSD etc.) and it is therefore expected that modifying the cables for DEH use will require limited modifications. Higher frequencies may require comprehensive qualification work to develop a proper cable insulation system.

Figure 1A:
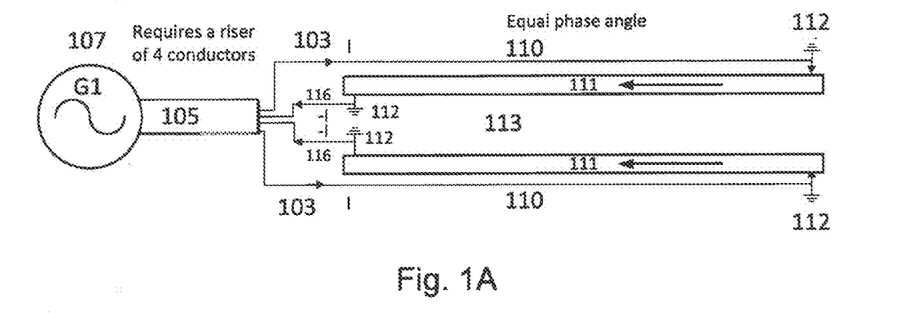
FIG. 1A shows a traditional DEH configuration, with equal phase angle, which needs a riser with 4 conductors.

The installed DEH systems for parallel pipelines are traditionally fed from the same (equal) powered phase for the DEH piggyback cable to each pipeline (FIG. 1A).

According to the present invention the system for DEH and induction heating among others introduces heating of parallel pipelines fed from power supply at different phase angles in order to reduce the current in the supply cables when the pipelines are simultaneously heated.

Figure 17:
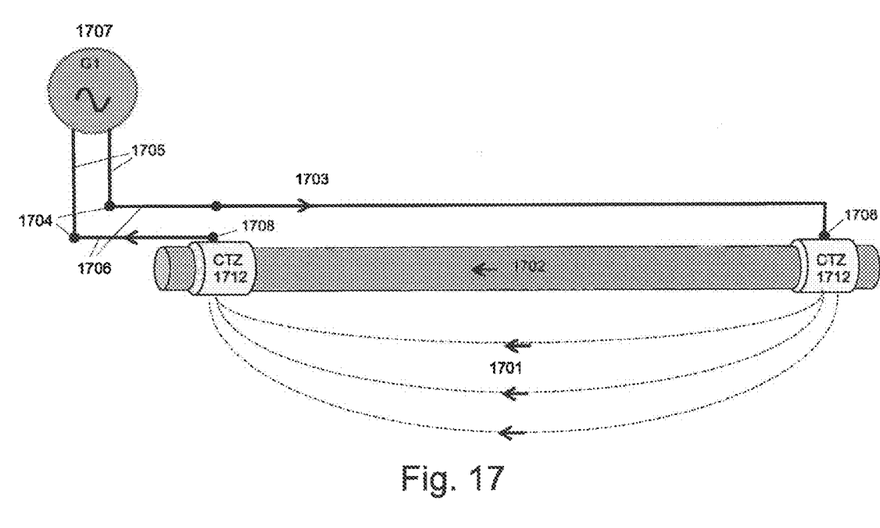
FIG. 17 shows an example of heating of a single pipeline according to prior art, where the return current in seawater is indicated.

Traditional DEH systems include a separate feeding power cable and a separate return cable per DEH pipeline (FIG. 1A), furthermore the pipelines 111 and the connections from power cables 110 to the pipelines 111 are not electrically insulated from the surrounding seawater (FIG. 17), and hence the DEH system is not a closed loop system as electric currents 1701 will flow in the seawater parallel to DEH pipelines. As a consequence of this it is not feasible to provide an efficient DEH system by simply providing a closed electric loop for several pipelines that are supposed to be heated either by DEH or induction heating (FIG. 17).

Figure 14:
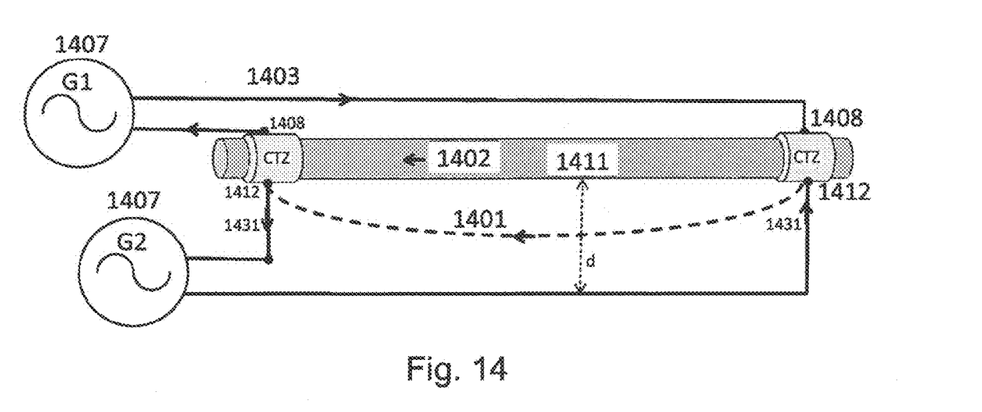
FIG. 14 shows a method for reduction of transfer current through the anodes in near end CTZ close to G1 and far end CTZ remote from G1 according to one aspect of the present invention in which the distance between a DEH pipeline and the reduction transfer current cable, d, is determined by the power frequency, typically 5 m (or more). '$I_n$' and '$I_p$' are currents in seawater and pipeline respectively.
Figure 15:
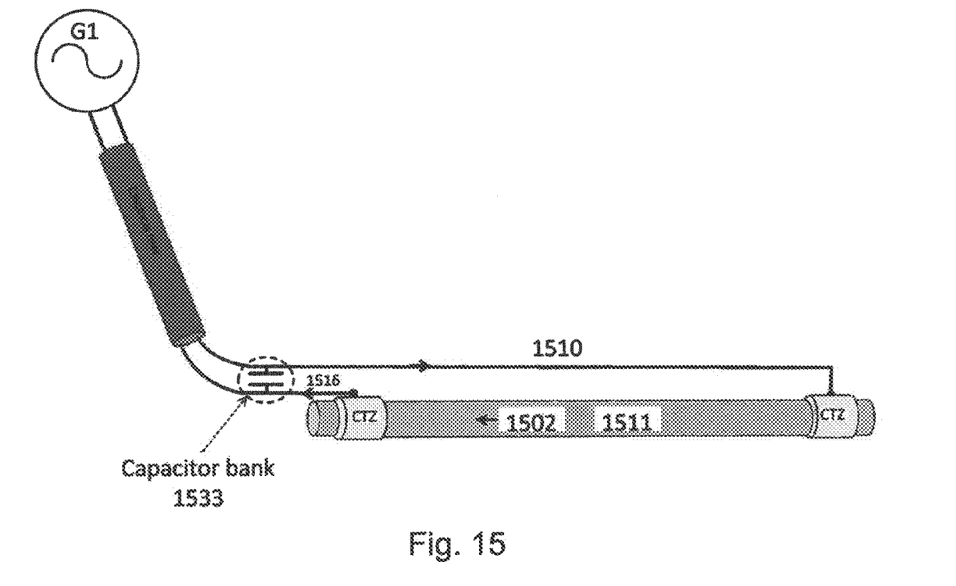
FIG. 15 shows an example of a compensation unit (capacitor bank) located subsea in order to reduce the conductor cross section of single core cables in the electrical riser.
Figure 16:
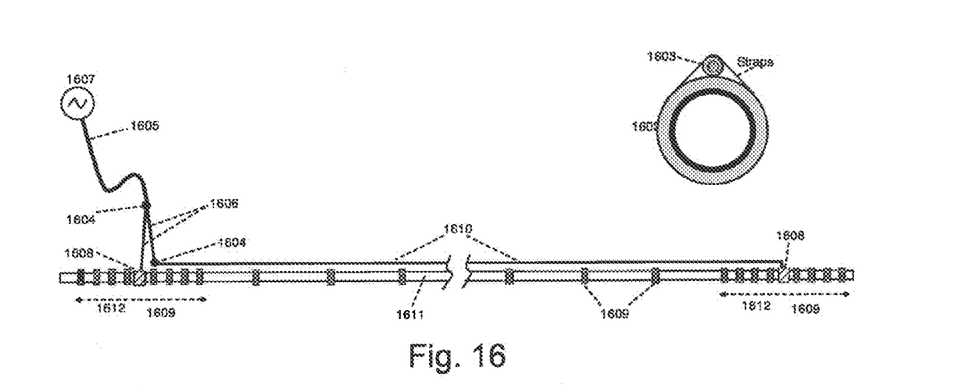
FIG. 16 shows an example of heating of a single pipeline according to prior art with a piggy backed feeding cable and a plurality of anodes.

In the following a new configuration for one or more power supplies from top side 207 to far end of one or more pipelines will be described. Following this it will be described solutions which increase the efficiency of the heating of single or parallel pipelines as such. To overcome problems related to high currents at anodes in CTZ and to complete the picture of a complete system for DEH of pipelines it is also disclosed a configuration for reduction of current through the anodes in CTZ (FIG. 14). Finally, to encompass most possible DEH configurations attention the DEH system according to the present invention also discloses a compensation unit which reduces riser cable sizes (FIG. 15). Hence, according to the present invention it is disclosed a complete system for DEH which includes several elements which forms such a system.

Figure 1B:
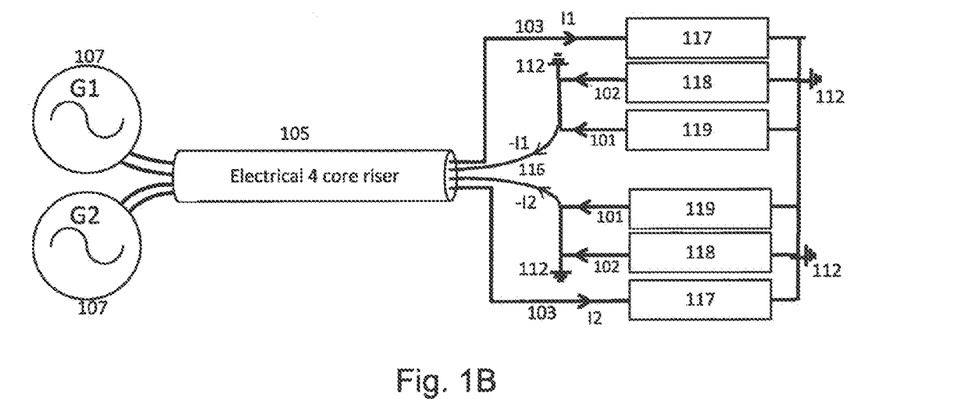
FIG. 1B shows an equivalent circuit of FIG. 1A, with a riser with 4 conductors.

FIG. 1A shows the case for the traditional system which uses equal phase for the piggyback cables 110. In this case 4 single core cables are needed in a riser cable 105, with equal total current in all single core cables. An equivalent circuit diagram FIG. 1B is included for this case with impedances indicated as 117, 118 and 119 for the two pipelines 111. The following indexes apply for FIG. 1B:
The impedances related to the pipelines 11 are:
  117—impedance of piggyback cable
  118—impedance of pipeline 111
  119—impedance of seawater and seabed
The feeding current to the uppermost pipeline is indicated as $I_1$, whereas the feeding current to the lowermost pipeline is indicated as $I_2$.

Figure 2A:
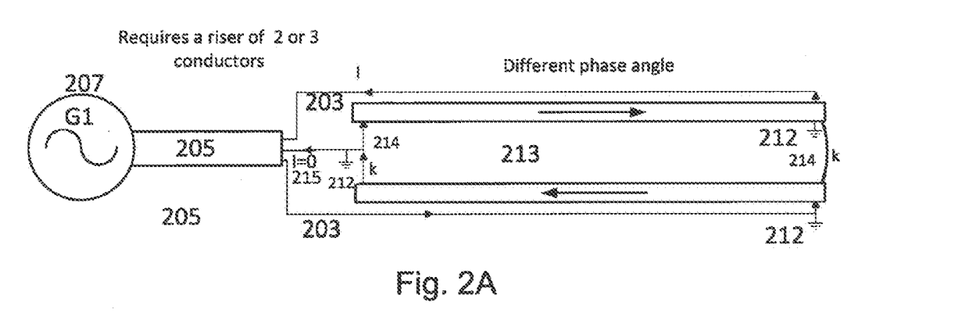
FIG. 2A shows one example of a new DEH configuration according to one aspect of the present invention, with different ohase angle and 2 or three conductors in the riser.

FIG. 2A shows means and a system according to one embodiment of the present invention with 180° difference in phase angle between the currents 203 in the piggyback cables to each pipeline.

Figure 2B:
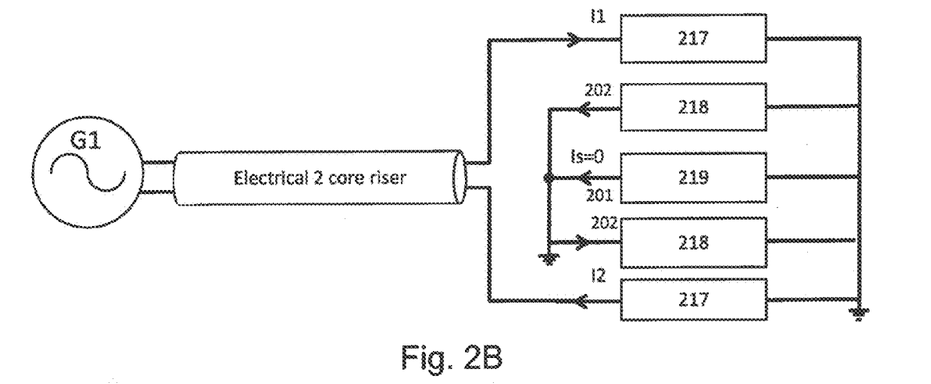
FIG. 2B shows equivalent circuit of FIG. 2A with a 2 core riser configuration.
Figure 2C:
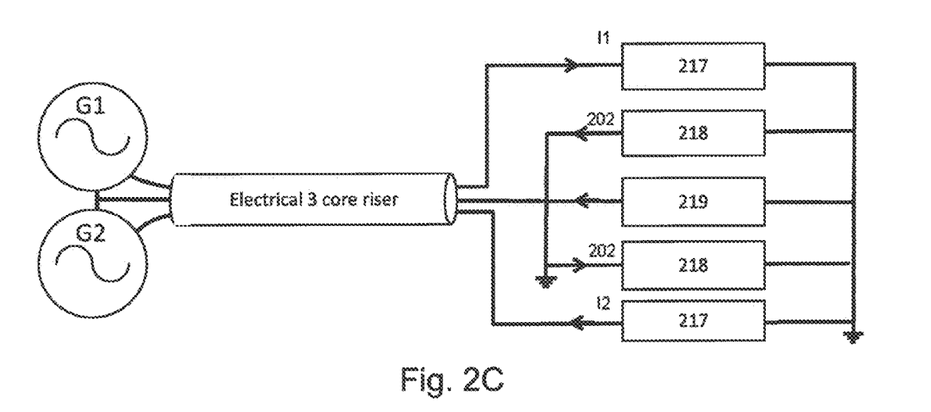
FIG. 2C shows equivalent circuit of FIG. 2A with a 3 core riser configuration

The following indexes apply for FIGS. 2B and 2C respectively:
The circuit equivalents are:
  Case B: A 2 core electrical riser is needed when equal absolute current $I_1$ and $I_2$ are needed to supply the two pipelines.
  The references in the figures are:
    217: impedance of piggyback cable
    218: impedance of pipeline
    219: impedance of seawater and seabed
    202: represent the currents flowing in the pipelines
    201: represent the seawater current, $I_s$, which in Case B is approximately zero.
  Case C: A 3 core electrical riser is needed when heating two pipelines, which requires different currents. The same names are used for the references as in FIG. 2B, however the seawater current 201 is a function of the current imbalance between the pipelines and this current is in communication with the top site, G1, G2 through a separate cable in the riser.

At the far end the pipelines are connected by power cables (FIG. 2A), and hence the transfer currents through the anodes in CTZ will be considerably reduced compared to the traditional case. On the FIG. 2A it is indicated a short-circuit connection (cable) "k" 214 at the far end and at the near end. The short circuits at the pipe ends will reduce the current through seawater considerably and hence contribute to limit the current through the anodes to a minimum. The risk for corrosion due to AC will therefore be unlikely, even for continuous heating. Hence, the safety distance to steel structures, valves, etc. can be considerably reduced compared to the case in FIG. 1A. Only two conductors (FIG. 2B) in the riser cable are connected and hence the temperature rise in the electrical riser will be considerably reduced compared to the traditional case (FIG. 1A). The total return current in seawater is close to zero. Two equivalent circuits (FIG. 2B, FIG. 2C) are shown indicating the case when equal currents are needed to feed the two pipelines (FIG. 2*b*) and the other requiring different current levels (FIG. 2C) to feed the pipelines. In case of equal values of the current a two core riser (FIG. 2B) is needed and a three core riser (FIG. 2C) is needed when different current values are supplied to each DEH pipeline.

Figure 3:
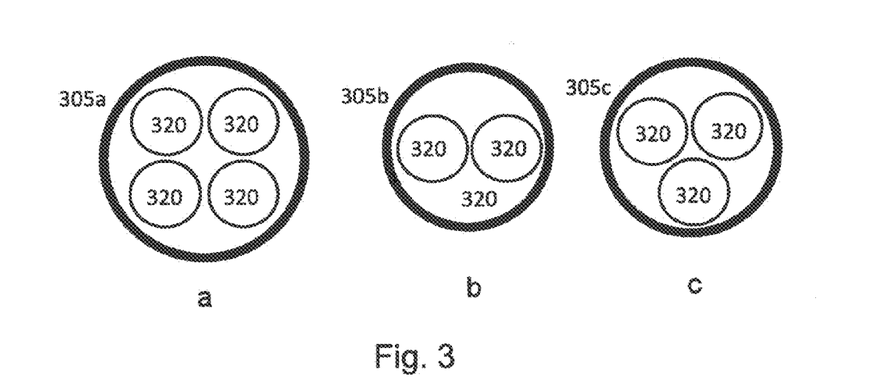
FIG. 3a shows a traditional supply cable design, required for the case in FIG. 1A.
FIG. 3b shows an example of a design according to one embodiment of the present invention with two cores (simultaneous heating of two pipelines with equal supply currents), actual for the Case B in FIG. 2B.
FIG. 3c shows an example of a design according to one embodiment of the present invention with three cores (simultaneous or individual heating of two pipelines), actual for the case C in FIG. 2C.

The traditional and new designs for the supply cables for two pipelines are shown in FIGS. 3*a*, 3*b* and 3*c*. The traditional design is in FIG. 3*a*. FIG. 3*b* shows the new design for feeding two pipelines simultaneously. FIG. 3*c* shows the design being applicable for both simultaneous and individual heating of two pipelines in a symmetric and asymmetric system.

In FIG. 1A and FIG. 2 platform (power supply location) and the electrical riser are shown. In the following figures these parts of the installation are not shown in the figures.

Figure 4:
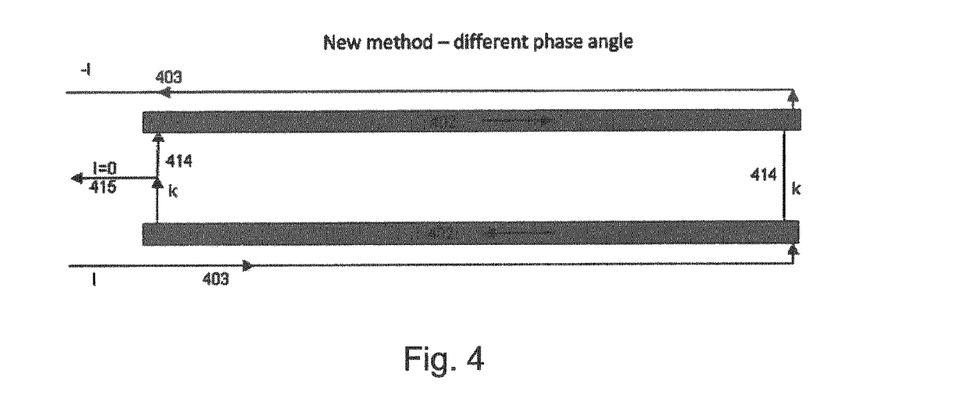
FIG. 4 shows the system in FIG. 2A with pipelines connected (by cables) at the far end, with different phase angle.

FIG. 4 shows the system in FIG. 2 with the pipelines connected (by cables) at the far end. By the cable connections in both ends, the transfer current through the anodes in CTZ will be reduced to a minimum and the safety distance can be reduced in both ends compared to the traditional case in FIG. 1A. Only two conductors in the riser cable are connected and hence the temperature rise in the riser will be considerably reduced compared to the traditional case (FIG. 1A). The total return 415 in seawater is close to zero.

Figure 5:
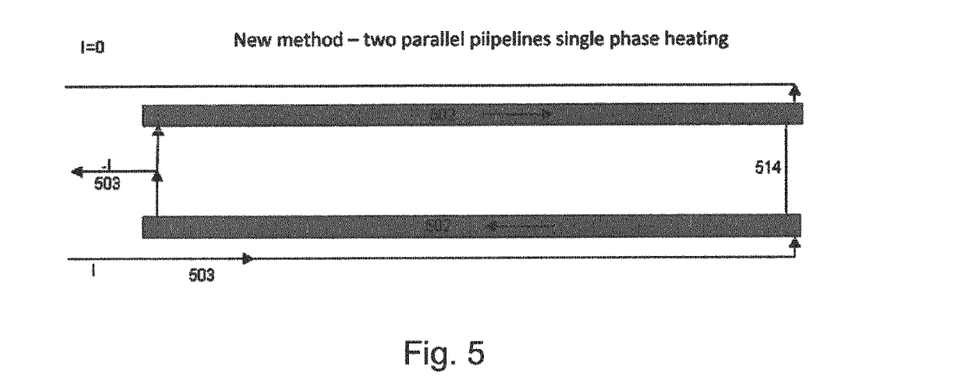
FIG. 5 shows the case with a single pipeline heated according to one embodiment of the present invention in which a "third conductor" is required (assuming approximately 180° difference in phase angle between the two currents in case of heating of both pipelines)

FIG. 5 shows the case with a single pipeline heated. In this case the "third conductor" is required (assuming 180° difference in phase angle between the two currents in case of heating of both pipelines). In this case the current through the anodes in CTZ transfer the total seawater current, which is typically 30%-50% of the piggyback cable current.

Figure 6:
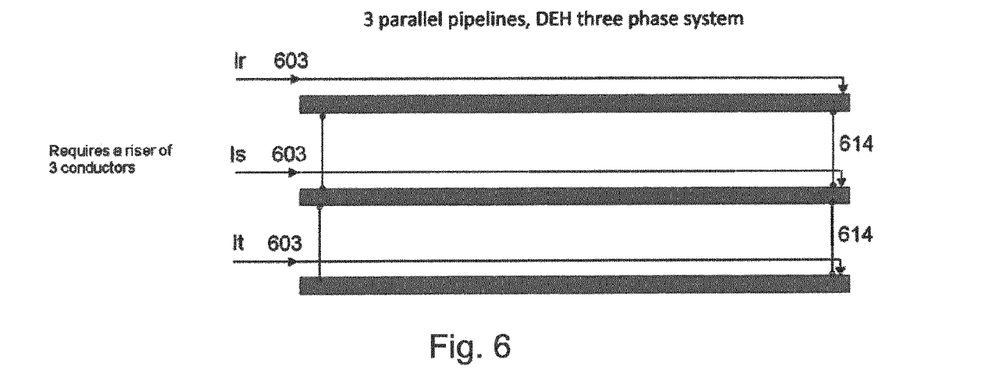
FIG. 6 shows one embodiment according to the present invention with three pipelines with a three phase system (three conductors in the riser cable are required)

FIG. 6 shows the case with three pipelines where all of the three pipelines are to be heated with a three phase system $I_r$, $I_s$, $I_t$, i.e. three conductors in the riser cable are required.

Figure 7:
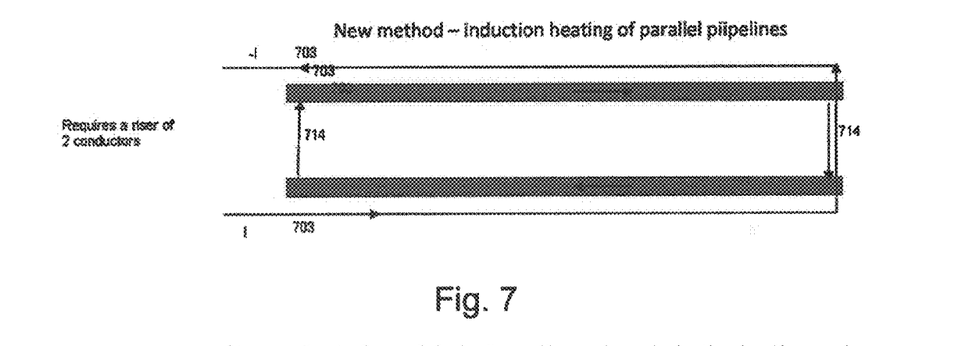
FIG. 7 shows induction heating with a single phase system where the pipelines are connected by cables at each end.

An alternative to DEH is induction heating. FIG. 7 shows an example with a single phase system. The pipelines are connected by cables at each end. The end zone lengths are negligible and by this method "cold pipe ends" are avoided. The required current is similar to the DEH case in FIG. 4. Two conductors in the riser cable are required.

Figure 8:
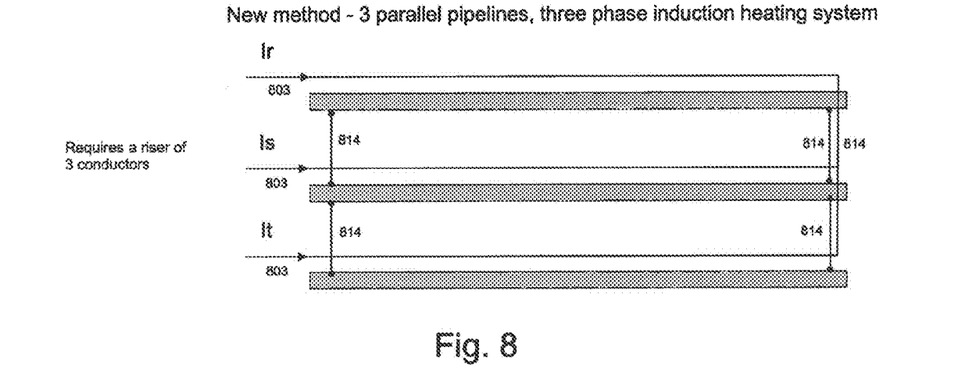
FIG. 8 shows an example of induction heating according to one embodiment with three pipelines with a three phase induction heating system.

FIG. 8 shows the case with three pipelines with a three phase induction heating system (three conductors in the riser cable are required).

Figure 9:
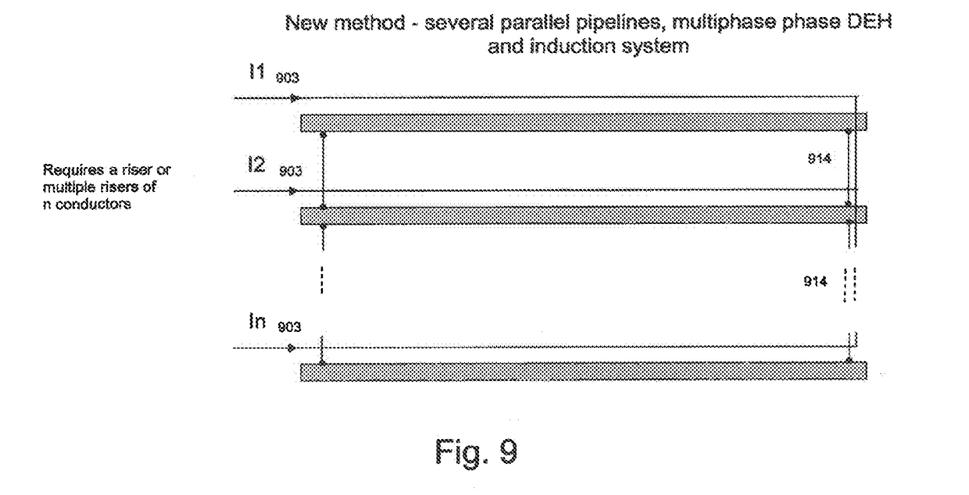
FIG. 9 illustrates an example according to one embodiment with "n" pipelines, where M of the n pipelines are heated and where n=M, the numbers of feeding conductors are W=n.

FIG. 9 illustrates the case with "N" pipelines, where all of the N pipelines are to be heated. In the event that the number of pipe lines to be heated differs from the total numbers of pipeline, the denomination N is used for the total numbers of pipelines and the denomination M is used for the numbers of pipelines to be heated, obviously N≥M. An "M" phase system (DEH or induction heating system) is possible.

The circuit designs indicated above for supply of power to DEH pipelines will at least effectively result in;
  Reduction of phase conductors and heat development (temperature rise) in the riser cable (the cable routed from the topside power system to the connections to the DEH cables subsea, consisting of several single core cables).
  Reduction of currents through the anodes in CTZ
  Reduced area exposed to electrical and magnetic field at the pipelines ends Reduced currents in seawater i.e. reduced currents and induced voltages in neighbouring structures, umbilicals, etc.

Increased efficiency of DEH

The outer surface pipe structure is important regarding efficiency of DEH [1, 2]. According to one aspect of the present invention it is provided a special grit blasting, or alternative surface treatment methods, technique for the outer steel pipe surface. It is also disclosed a method and means for providing an optimum pipe self-impedance regarding efficiency of DEH (power development in the steel pipe related to the current in the DEH cable). Furthermore the invention also includes a computation method for rating DEH by taking into account the effect of pipe surface electrical and magnetic properties.

Increased efficiency by the special grit blasting (surface treatment) technique is applicable for both single and parallel pipelines. The method is applicable for different power frequencies (typical 50-200 Hz) and pipe materials (carbon steel, clad steel, BUBI, stainless steel, duplex, 13Cr pipelines). The method is applicable for the entire pipeline length, but also for parts of the pipelines where there are advantageous with a defined pipe self-impedance for instance in the CTZ (current transfer zones), close to inline Tees etc.

Figure 11:
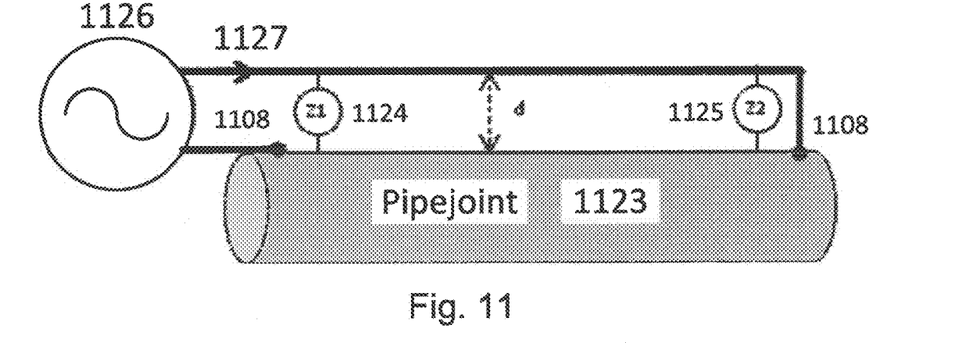
FIG. 11 shows an example of a laboratory test set-up to determine pipe joint impedance.
Figure 12:
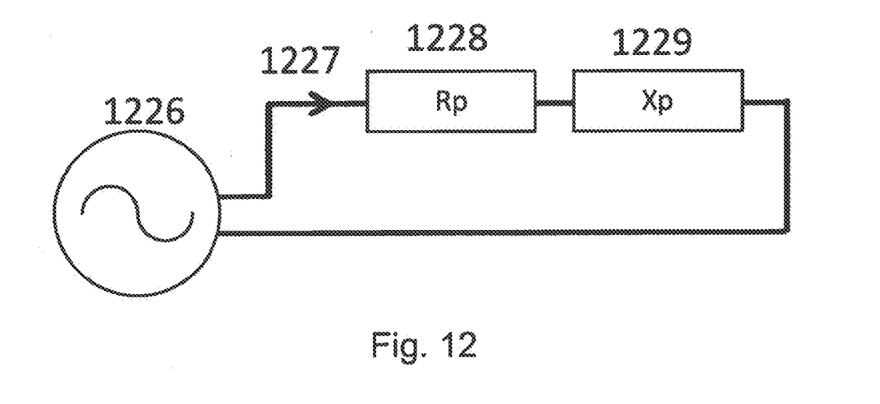
FIG. 12 shows an equivalent electrical circuit for the laboratory test set-up in FIG. 11.
Figure 13:
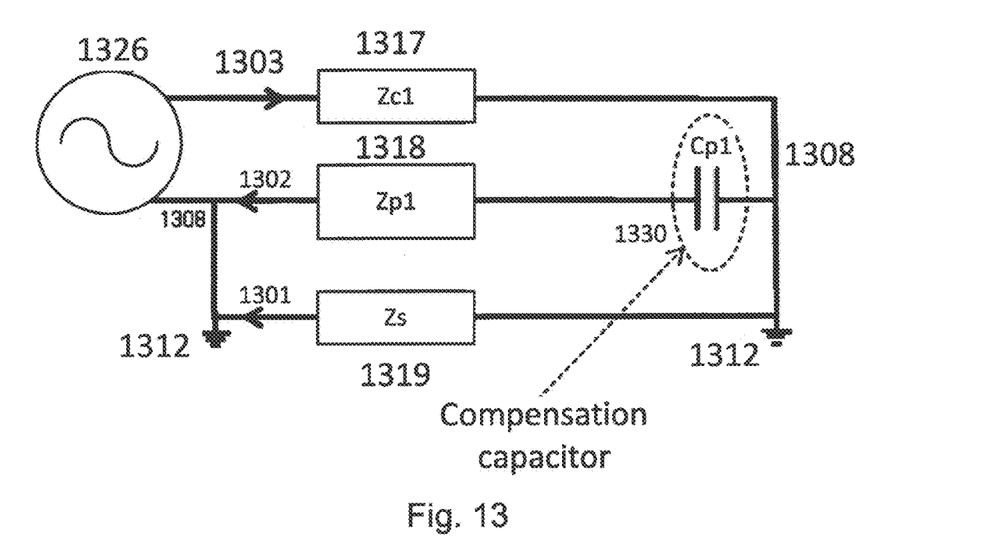
FIG. 13 shows an equivalent electrical circuit for the finite element simulations of electrical rating of DEH with a compensation capacitor Cp1.

Measurements are required to provide the circuit equivalent resistance, Rp, and reactance, Xp, FIG. 12. A principle test set-up to provide these data is shown in FIG. 11. The test set-up consists of a pipe joint 1123 (typically 6 m or 12 m long) applied current through a cable connected to the near end and a cable routed at constant distance d from the pipe connected to the far end. The impedance (Rp+Xp) is determined by measuring the total impedance, Z1 1124, and the impedance, Z2 1125, for the end connection at the far end. By subtracting Z2 from Z1, the pipe impedance is determined. FIG. 12 shows the equivalent circuit diagram for the test set-up in FIG. 11. For rating of DEH the finite element method (FEM) is required and the pipe impedance determined by the test-set up in FIG. 11 cannot be used directly as input. By comparative finite element simulations a relative permeability value can be determined from the tests. To make agreement with both the pipe resistance, Rp 1228, and the pipe reactance, Xp 1229, a virtual capacitor 1330 is introduced as shown in the equivalent circuit diagram for the DEH system in FIG. 13, and this modified circuit is applied in the combined thermal/electrodynamic computations utilizing an FEM tool. The pipe joint impedance, and hence relative permeability (μr) and the virtual capacitor (Cp1 1330), can be determined as a function of the pipe current (I) 1302 and distance (d) between the piggyback cable and pipe, i.e. as a function of the magnetic flux density (B):

$$\mu r = \mu r(I,d) = \mu r(B) \quad (Eq. 1)$$

$$Cp1 = Cp1(B) \quad (Eq. 2)$$

The rating of DEH by finite element simulations is carried out by using the relative permeability from Eq.1 and the virtual capacitor 1330 given from Eq 2 in the circuit equivalent for the DEH simulations in FIG. 13. The impedance values (Zc1 1317, Zp1 1318, Zs 1319) can then be derived for the finite element simulations, where Zp1=Rp1+jXp1 (complex number). This method has been verified by tests for different steel grades and power frequencies.

FIG. 14 shows an additional principle for avoiding current transfer through the anodes in the CTZ at the DEH pipeline ends. The disclosed method is applicable for heating of single pipelines 1411 (N=M=1), for a plurality of pipelines (N) where all of the pipelines shall be heated or where a fraction M of the pipelines shall be heated. In the event of avoiding/reducing current transfer for one single pipeline this is carried out by supplying current 1431 from at least one additional power source 1407 in a separate cable that should be routed in parallel to the heated pipeline 1411 at a distance determined by the power frequency, see FIG. 14. The current 1431 through this cable ("reduction transfer current cable") is adjusted equal to the value of the total transfer current through the anodes in CTZ (i.e. steady state current in seawater) without this cable connected. The phase angle for the reduction current shall have 180° displacement referred to the total transfer current 1402, 1401. The efficiency of this method depends on the power frequency, which should be in the range of 50-200 Hz. This method reduces the number of anodes in CTZ and risk for ac corrosion. Furthermore there are also advantages regarding exposure of magnetic field and stray current in neighbouring structures.

Also this configuration will be applicable for a retrofit DEH system, for traditional configurations as indicated in FIG. 1, or for configurations as indicated in FIG. 2-9.

Reduction of Riser Cable Size by Subsea Compensation Unit:

Until now the compensation unit for reactive power compensation has been located topside. The conductor cross section of the supply cable (electrical riser and connection cables between the riser cable and DEH cables subsea) from the topside power supply to the DEH cable connections subsea can be considerably reduced by locating a compensation unit, a capacitor bank, subsea as indicated in FIG. 15. It is possible to achieve a reduction of approximately 70% for the cable conductor cross section of the supply cables since the power factor is approximately 0.3 for the DEH system. This will be a significant improvement regarding installation, reduction of weight topside and subsequently cost reduction. The configuration with a subsea capacitor bank is applicable for all DEH or induction heating configurations disclosed herein.

| Reference numerals in the drawings | |
| --- | --- |
| Label number | Component type, parameter (e.g, current, impedance, ..) |
| x01 | Current in seawater |
| x02 | Current in steel pipeline/flowline (production, transport of oil/gas) |
| x03 | Current in piggyback cable (DEH cable) |
| x04 | Cable joints |
| x05 | Riser cable |
| x05a | |
| x05b | |
| x05c | |
| x06 | Feeder cable (overlength cable for installation of riser and maintenance of DEH system) |
| x07 | DEH topside power supply |
| x08 | Cable to pipe connection (termination plate) |
| x09 | Anodes in CTZ or along main pipeline/flowline, near end CTZ is closer to DEH topside powers supply than far end CTZ which is closer to the remote end of the pipeiine/flowline |
| x10 | DEH cable |
| x11 | Pipeline/flowline |
| x12 | Current transfer zone (CTZ). This part is supplied with anodes for grounding and current transfer |
| x13 | Seawater/seabed |
| x14 | Short circuit connection between two pipelines at the far or near ends of DEH pipelines |
| x15 | Current in common return conductor from two or more DEH pipelines |
| x16 | DEH cable current from the near end of DEH pipeline |

-continued

Reference numerals in the drawings

| Label number | Component type, parameter (e.g, current, impedance, ..) |
|---|---|
| x17 | DEH cable impedance |
| x18 | DEH pipeline/flowline impedance |
| x19 | Seawater impedance |
| x20 | Single core cable in riser |
| x21 | Pipe content |
| x22 | Pipe thermal insulation |
| x23 | Test pipe joint |
| x24 | Total impedance |
| x25 | End connection impedance |
| x26 | Power source |
| x27 | Test pipe current |
| x28 | Test DEH pipe resistance |
| x29 | Test DEH pipe reactance |
| x30 | Compensation capacitor |
| x31 | Reduction transfer current cable |
| x32 | Applied current equal to seawater current |
| x33 | Capacitor bank |

DEFINITION LIST

CTZ Current Transfer Zones
Near end Near end is closer to the DEH topside powers supply than the far end
DEH Direct Electrical Heating
VSD Variable Speed Drive
Piggyback cable or DEH Cable routed along the entire length of a cable pipeline, normally parallel to the pipeline at a defined distance to the pipeline
Piggybacked A cable or cables that run along the entire length of a pipeline in a piggyback configuration.
IH Induction Heating
AC Alternating Current
FEA Finite Element Analysis
FEM Finite Element Method

REFERENCES

1. LERVIK, J. K., et al. Direct Heating of Subsea Pipelines. *ISOPE*-93.
2. KULBOTTEN, Harald, et al. Direct Electrical Heating of Pipelines—A Method for Preventing Hydrates and Wax in Subsea Transport Pipelines. *NordIS* 2005.

The invention claimed is:

1. A device for high efficiency induction heating or direct electrical heating, of a plurality, M, of pipelines, where $M \in [1, N)$ of a group of parallel subsea pipelines N arranged adjacent to each other, where $N \in [2, \infty)$, and where a number of conductor cables, W, supplies electrical power from at least one top side power supply to M of the parallel subsea pipelines N, wherein the numbers of electric conductors, W, from the at least one top side power supply connected to the M pipelines is defined to be in the group $W \in [N, N+1]$, where N, W and M are natural numbers, and wherein a second power supply G2 is provided to supply current in a reduction transfer current cable routed in parallel to the heated pipeline(s) M at a distance, d, the current through the reduction transfer current cable is adjusted to equal the absolute value of a steady state current in seawater, thereby reducing current transfer through CTZ.

2. The device according to claim 1, wherein electric AC current with different phase angle in each of the W electric conductors is supplied to the M pipeline(s).

3. The device according to claim 1, wherein at least a first of two pipelines are supplied with electric power at a far end Current Transfer Zone of the at least two pipelines.

4. The device according to claim 3, wherein the electric power at the far end of two pipelines, the first and a second pipeline, is fed by one power cable which runs in parallel to the two pipelines and which is connected to the first pipeline at the far end Current Transfer Zone, current is transferred through the first pipeline to a near end Current Transfer Zone, at the near end Current Transfer Zones the first pipeline is electrically connected to the second pipeline, current is transferred through the second pipeline to the far end Current Transfer Zone, whereas return current is returned to a riser by one power cable connected to the second pipeline at the far end Current Transfer Zone.

5. The device according to claim 4, wherein a short circuit connection is connected between the connections at the far and near end Current Transfer Zones of the two pipelines.

6. The device according to claim 1, wherein electric power at the far end of the at least two pipelines, the first and second pipeline, is fed by one power cable, which runs in parallel to the two pipelines, and which is connected to the first pipeline at a far end Current Transfer Zone, current is transferred through the first pipeline to a near end Current Transfer Zone, at the near end Current Transfer Zone the first pipeline is electrically connected to the second pipeline and to a centre return conductor, current is transferred through the second pipeline to the far end Current Transfer Zone, whereas return current from the second pipeline is returned to a riser by one power cable connected to the second pipeline at the far end Current Transfer Zone.

7. The device according to claim 2, wherein the phase difference between current's phase angle supplied from top side is $2\pi/M$, where M is the number of pipelines to be heated.

8. The device according to claim 1, wherein the at least one power supply is a power source of 50-200 Hz source.

9. The device according to claim 1, wherein intermediate anodes is connected to the M pipelines between a near end and far end Current Transfer Zone.

10. The device according to claim 1, wherein at least portions of the at least one of the pipelines to be heated are treated by surface treatments methods so as to provide an optimum pipe impedance.

11. The device according to claim 10, wherein the surface treatment method includes grit blasting.

12. The device according to claim 10, wherein rating of DEH of the at least portions of the pipelines to be heated is provided by means of finite element simulations in which an equivalent electrical circuit of the at least portions of the pipelines to be heated, and power supply conductors, are provided as input to the finite element simulations.

13. The device according to claim 12, wherein the input parameters to the finite elements method at least comprises:
   $\mu r$, the relative permeability which is a function of current and distance between a pipeline to be heated and a power supply cable which runs in parallel to the pipeline or portion of pipeline;
   Cp1, which is a function of the pipe current and distance between the power supply cable and the pipe;
   Zc1, which is the impedance of the power supply cable which runs in parallel to the pipeline or portion of pipeline;
   Zp1, which is the impedance of the pipeline or portion of pipeline excluding Cp1, and
   Zs, which is the impedance of the seawater surrounding said pipeline or portion of pipeline.

14. The device according to claim 1, wherein the phase angle for the reduction current shall have approximately 180° displacement referred to the total transfer current.

15. A system for direct electrical heating or induction heating of at least a first of at least two parallel subsea pipelines comprising power cables in which at least one supplies electric power from a top side to the at least first of at least two parallel subsea pipelines, where the system further comprises,
- at least one power supply at the top side;
- at least one riser cable including at least two power cables; and
- at least two connections from the at least two power cables from the at least one riser, one connection to a return power cable at a near end Current Transfer Zone, where the return cable runs in parallel with a second pipeline and is connected to the second pipeline at a far end Current Transfer Zone and one connection to a power supply cable at the near end Current Transfer Zone which runs in parallel with the first pipeline and which is connected to the far end Current Transfer Zone of the first pipeline.

16. The system for direct electrical heating or induction heating according to claim 15, wherein at least one capacitor bank is provided between the power supply cables.

17. The system for direct electrical heating or induction heating according to claim 15, wherein a second power supply G2 is provided to supply current in a reduction transfer current cable routed in parallel to the heated pipeline(s) M at a distance, d, the current through the reduction transfer current cable is adjusted to equal the absolute value of a steady state current in seawater, thereby reducing current transfer through Current Transfer Zones.

18. The system for direct electrical heating or induction heating according to claim 15, wherein at least one capacitor bank is provided between at least two power cables subsea, where the power cables are intended to supply current for DEH or induction heating of one or more subsea pipelines, thus reducing the power cable cross section between the capacitor bank and the at least one top side power supplies.

19. A device for high efficiency induction heating or direct electrical heating, of a plurality, M, of pipelines, where $M \in [1, N\rangle$ of a group of parallel subsea pipelines N arranged adjacent to each other, where $N \in [2, \infty)$, and where a number of conductor cables, W, supplies electrical power from at least one top side power supply to M of the parallel subsea pipelines N, wherein the numbers of electric conductors, W, from the at least one top side power supply connected to the M pipelines is defined to be in the group $W \in [N, N+1]$, where N, W and M are natural numbers where at least a first of two pipelines are supplied with electric power at a far end Current Transfer Zone of the at least two pipelines, and where the electric power at the far end of two pipelines, the first and a second pipeline, is fed by one power cable which runs in parallel to the two pipelines and which is connected to the first pipeline at the far end Current Transfer Zone, current is transferred through the first pipeline to a near end Current Transfer Zone, at the near end Current Transfer Zones the first pipeline is electrically connected to the second pipeline, current is transferred through the second pipeline to the far end Current Transfer Zone, whereas return current is returned to a riser by one power cable connected to the second pipeline at the far end Current Transfer Zone and wherein a short circuit connection is connected between the connections at the far and near end Current Transfer Zones of the two pipelines.

* * * * *